(12) United States Patent
Lee

(10) Patent No.: US 6,915,065 B2
(45) Date of Patent: Jul. 5, 2005

(54) DATA PROCESSING SYSTEM ARCHITECTURE

(75) Inventor: Thomas Lee, Aurora, CO (US)

(73) Assignee: American Video Electronics, Inc., Denver, CO (US)

( * ) Notice: Subject to any disclaimer, the term of this patent is extended or adjusted under 35 U.S.C. 154(b) by 109 days.

(21) Appl. No.: 10/395,014

(22) Filed: Mar. 21, 2003

(65) Prior Publication Data

US 2004/0184761 A1 Sep. 23, 2004

(51) Int. Cl.[7] .......................... H04N 5/91; H04N 5/225
(52) U.S. Cl. ........................................ 386/46; 386/118
(58) Field of Search .............................. 386/46–52, 124, 386/125, 45, 40, 118, 117, 107; H04N 5/91, 5/225

(56) References Cited

U.S. PATENT DOCUMENTS

| | | | | |
|---|---|---|---|---|
| 5,690,399 A | * | 11/1997 | Davis | 312/9.58 |
| 5,724,321 A | * | 3/1998 | Vishlitzky | 369/30.3 |
| 5,856,894 A | * | 1/1999 | Marlowe | 360/92 |
| 5,870,245 A | * | 2/1999 | Kersey et al. | 360/92 |
| 5,936,624 A | * | 8/1999 | Lisle et al. | 715/835 |

* cited by examiner

Primary Examiner—Robert Chevalier
(74) Attorney, Agent, or Firm—Cochran Freund & Young LLC; Brian K. Herbert; Samuel M. Freund

(57) ABSTRACT

Disclosed is a data processing system architecture, as may be employed in a digital video security system, that provides easy identification of system components such as system and video data hard drives through physical position and orientation, through color and identifying markings, and through keyed locking mechanisms. A component-mounting fixture disposed in a cabinet provides bays for removable accommodation of component trays containing hard drives or other system components. Component trays may be hot pluggable. The cabinet may be rack mounted or free standing. Component trays provide sufficient room that a circuit card and/or connector(s) may be affixed thereto and provide connection, signal conditioning, and format translation of component signals. A lock knob on the component tray secures the component tray in a bay and a lock knob stay may be employed to restrict lock knob movement and may also serve as a handle for component tray removal.

31 Claims, 7 Drawing Sheets

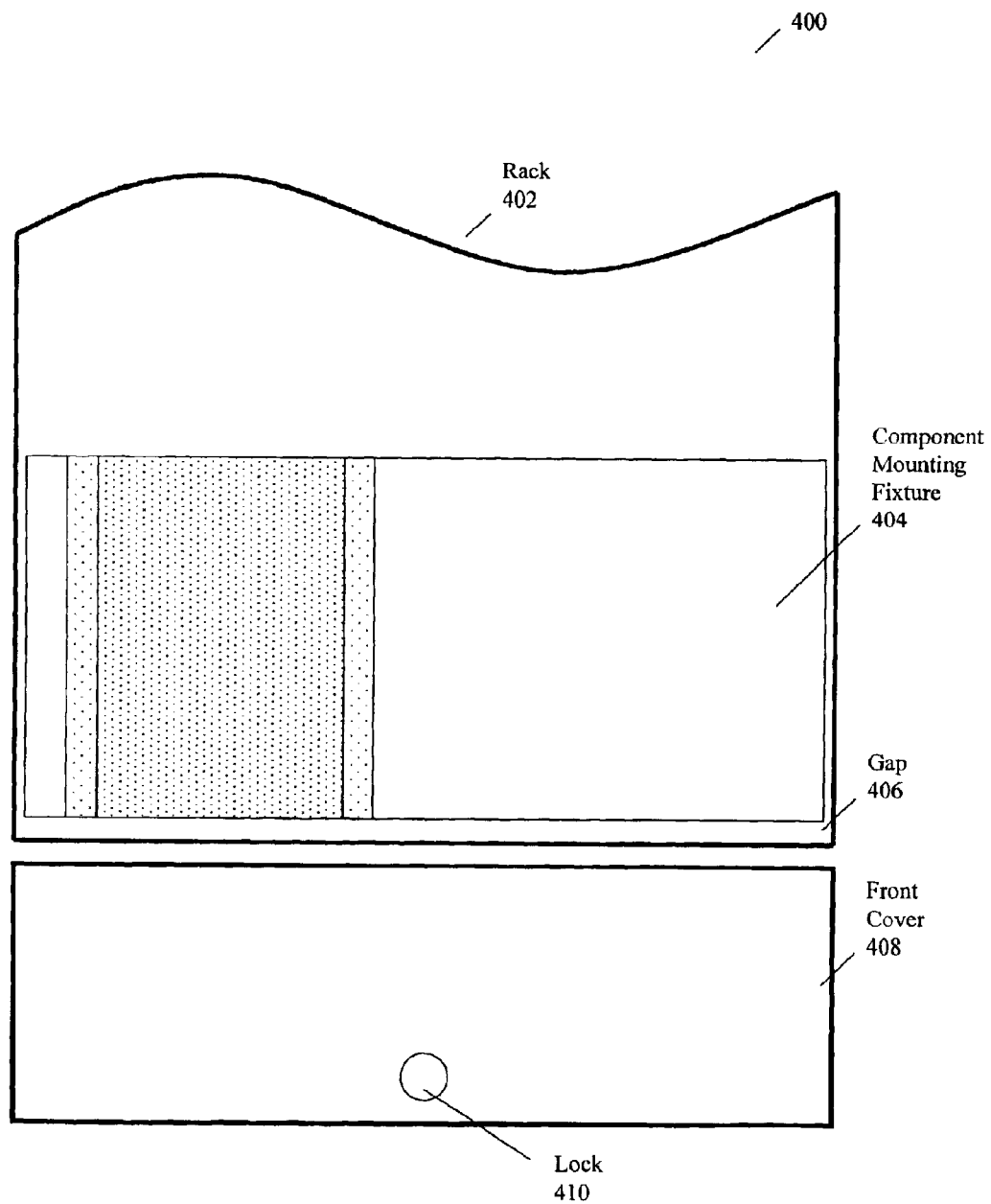

DATA PROCESSING SYSTEM ARCHITECTURE

BACKGROUND OF THE INVENTION a. Field of the Invention

The present invention pertains generally to digital data storage systems and more specifically to a digital video acquisition and storage system tailored to non-technical users.

b. Description of the Background

Advances in integrated circuit and data storage technologies have reduced the cost of acquiring and digitally storing large volumes of video information. Such technologies have been employed in digital video recording security systems that provide monitoring of business and residence areas. These systems frequently include a plurality of hard disk drives for storing video information and may operate for extended periods (weeks, months, or even years) without user intervention. These systems may also employ motion detection, timed operation and other methods to more efficiently use the available storage capacity.

Digital video security systems are often constructed from a combination of personal computer components and data storage components common to servers and storage arrays. Digital video security systems may be installed, operated, and maintained by homeowners or operators of businesses. The structure and layout of present systems often employ a uniform array of components, and may require internal access, or access to the rear of the system cabinet, to service or upgrade system components. Identification of specific components may often be difficult due to the similarity of placement and similarity of appearance of a number of components that serve different purposes. Improper identification of components may lead to the wrong component being removed or replaced. Further, the user's interaction with the system hardware may be infrequent and aspects of the system may be forgotten during the interval since the last time the system hardware was accessed. Therefore, a user-friendly and easily discernable system architecture that is easier to use and service by users is needed.

SUMMARY OF THE INVENTION

The present invention overcomes the disadvantages and limitations of the prior art by providing a data processing system architecture and method that may be employed with digital video security systems that provides a high capacity, space efficient, user-friendly easy to use and maintain system.

The present invention may therefore comprise a data processing system having replaceable components comprising: a cabinet having a user accessible front portion; a processor and memory disposed in the cabinet; a plurality of data storage devices disposed in a first orientation in the cabinet and removably accessible from the front portion of the cabinet; a system data storage device disposed in the cabinet in a second orientation dissimilar from the first orientation for distinguishing the system data storage device from the plurality data storage devices, the system data storage device being removably accessible from the front portion of the cabinet; and a removable media drive disposed in the cabinet such that the media is removably accessible from the front portion of the cabinet; the processor, the memory, the plurality of data storage devices, the system data storage device and the removable media drive cooperating to form the data processing system, such that the dissimilar orientation of the plurality of data storage devices and the system data storage device readily distinguishes the plurality of data storage devices and the system data storage device.

The present invention may further a data processing system having replaceable components comprising: a cabinet having a user accessible front portion; a processor and memory disposed in the cabinet; a component mounting fixture disposed in the cabinet having a first bay having a first orientation and plurality of second bays having an orientation dissimilar from than the first orientation such that the dissimilarity in orientation is readily distinguishable; a system data storage device disposed in the first bay of the component mounting fixture wherein the system data storage device is removably accessible from the front portion of the cabinet; at least one data storage device disposed in one of the plurality of second bays of the component mounting fixture wherein the at least one data storage device is removably accessible from the front portion of the cabinet; a removable media drive disposed in another bay of the component mounting fixture such that the media of the removable media device is accessible from the front portion of the cabinet, the processor, the memory, the at least one data storage device, the system data storage device and the removable media drive cooperating to form the data processing system, such that the dissimilar orientation of the plurality of second bays and the first bay readily distinguishes the at least one data storage devices and the system data storage device.

The invention may further comprise a data processing system having replaceable components comprising: a cabinet having a user accessible front portion; a processor and memory disposed in the cabinet; a component mounting fixture disposed in the cabinet having a first bay having a first orientation and plurality of second bays having an orientation dissimilar from the first orientation such that the dissimilarity in orientation is readily distinguishable; a system data storage device disposed in a first component tray installed in the first bay of the component mounting fixture wherein the system data storage device is removably accessible from the front portion of the cabinet; at least one data storage device disposed in a second component tray installed one of the plurality of second bays of the component mounting fixture wherein the at least one data storage device is removably accessible from the front portion of the cabinet; a removable media drive disposed in another bay of the component mounting fixture such that the media of the removable media device is accessible from the front portion of the cabinet, the processor, the memory, the at least one data storage device, the system data storage device and the removable media drive cooperating to form the data processing system, such that the dissimilar orientation of the plurality second bays and the first bay readily distinguishes the at least one data storage device and the system data storage device.

The present invention may further comprise a method of upgrading a data processing system having a plurality of replaceable components accessible from a front portion of a cabinet containing said data processing system comprising: supplying a user with a replacement system data storage device disposed in a component tray containing system software for the data processing system; instructing the user to remove power from the data processing system; identifying the system data storage device of the data processing system as the replaceable device accessible from the front portion of the cabinet of the system that has a different orientation than any other replaceable device accessible from the front portion of the cabinet of the system; instructing the user to remove the system data storage device; instructing the user to install the replacement system data storage device into the position vacated by the system data device; and instructing the user to turn power on to the data processing system.

Advantageously, the present invention provides a system that maybe easily maintained or upgraded by casual users or personnel that are unfamiliar with the system. Further, the present invention furnishes a low profile, space saving cabinet architecture that provides access to a system drive, a plurality of data drives, and removable media drives from the front of the cabinet. Locking drive trays and a system drive lock reduce likelihood of incorrect drive removal. Further the locking trays of the present invention help insure connection integrity as may be adversely affected by vibration or other forces applied to the system cabinet.

BRIEF DESCRIPTION OF THE DRAWING

In the drawings,

FIG. 4 depicts a rack assembly comprising a component-mounting fixture disposed in a rack or freestanding cabinet.

DETAILED DESCRIPTION OF THE INVENTION

Embodiments of the present invention provide a digital video security system architecture that is easy to service and maintain in a low profile cabinet that may be free standing or may be mounted in a rack.

Figure 1:
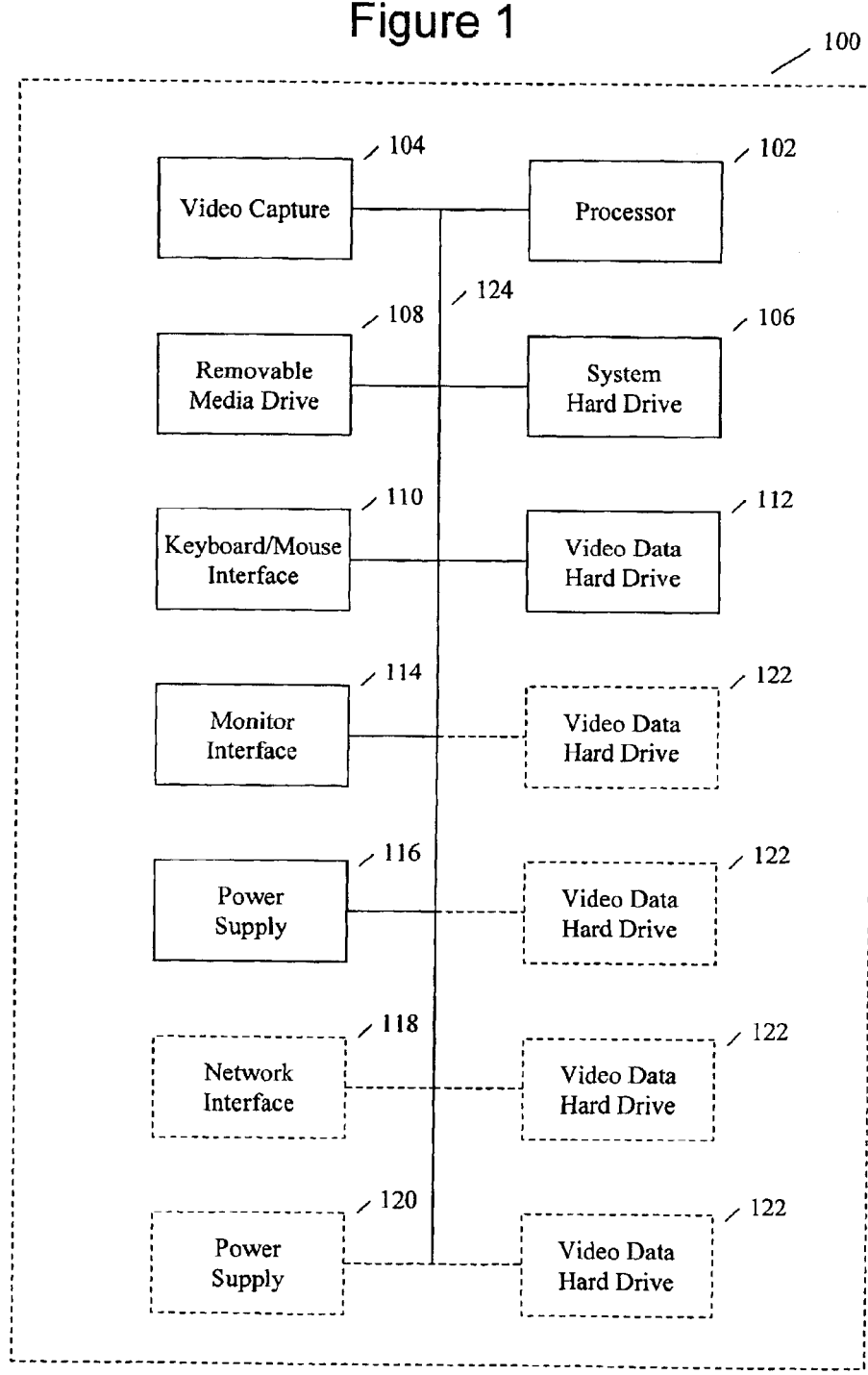
FIG. 1 is a system overview block diagram of a digital video security system.

FIG. 1 is a system overview block diagram of a digital video security system. Digital video security system 100 comprises processor unit 102, video capture unit 104, system hard drive 106, removable media drive 108, keyboard/mouse interface 110, video data drive 112, display monitor interface 114, power supply 116, and may optionally include network interface 118, secondary power supply 120, and a plurality of additional video data hard drives 122. Processor unit 102 includes memory and executes a software program that may be stored on system hard drive 106 or in memory. System hard drive 106 may be a removable unit, allowing simple upgrades and replacement of the drive in the event of failure. Video capture unit 104 receives an input from one or more video cameras and digitizes the video signal(s). A plurality of video signals may be digitized at one time. Alternatively, video capture unit 104 may receive video signals in digital form. Video capture unit may provide switching between a plurality of video inputs and may process a plurality of video inputs simultaneously. A digital video signal or signals are conveyed from video capture unit to processor unit 102 that may analyze the signal(s) and may store the signal(s) or a portion thereof on video data drive 112 or additional video data hard drives 122. Analyzing signals may include determining if motion exists, and may be restricted to a portion of an image. Video data drive 112 or additional video data hard drives 122 may be removed from the system for archival or transfer of information to another system. Alternatively, data from video data drive 112 or additional video data hard drives 122 may be transferred to removable media drive 108. Removable media drive 108 may comprise a floppy disk drive, CD writer drive, ZIP™ drive or any other writeable removable media including card based units such as PCMCIA cards, memory sticks, Flash memory cards, and the like. Keyboard/mouse interface 110 allows the user to configure system operation and to control playback of video segments. After configuration, the mouse and keyboard may be disconnected from the system. Power supply 116 provides power to system components. Secondary power supply 120 may be provided to power system components in the event of a failure of power supply 116. Similarly, power supply 116 may power system components in the event of a failure of secondary power supply 120.

In operation, system 100 may be configured to monitor specific areas at specific times of day. Cameras may be oriented to display key areas, such as doorways, vaults, and cash registers, for example. Configuration of the system may include a network interface, telephone interface, or other interface over which a message may be sent in the event that an alarm condition or other condition is detected. Such interfaces may allow remote access to the system, allowing review of stored video data, real-time monitoring, may allow configuration of the system, and may also be employed for remote diagnostics and maintenance. The system may include monitoring of system components, such as power supply voltages, for example, such that components that are likely to fail may be replaced.

Once the system is configured, it may operate for long periods of time, such as weeks, months, or years, without direct user intervention. Direct user intervention refers to physically accessing the system. The system may offer "set and forget" operation and may be situated in an out of the way location such as in a cabinet or in a closet since physical interaction with the system may be infrequent. At some point in time, a system component may fail or may become likely to fail, or the user may desire to upgrade system software. For example, a hard drive may malfunction or a warning of likely malfunction may be received. It is desirable that non-technical users easily perform any system repair or upgrade. This requires a simple to maintain system. Adding to the requirement for simplicity and user-friendliness is that the user may infrequently physically access the system and may not recall more complex system aspects. Embodiments of the present invention simplify user maintenance and upgrade tasks by providing a system that is user-friendly and simple to understand.

Figure 2:
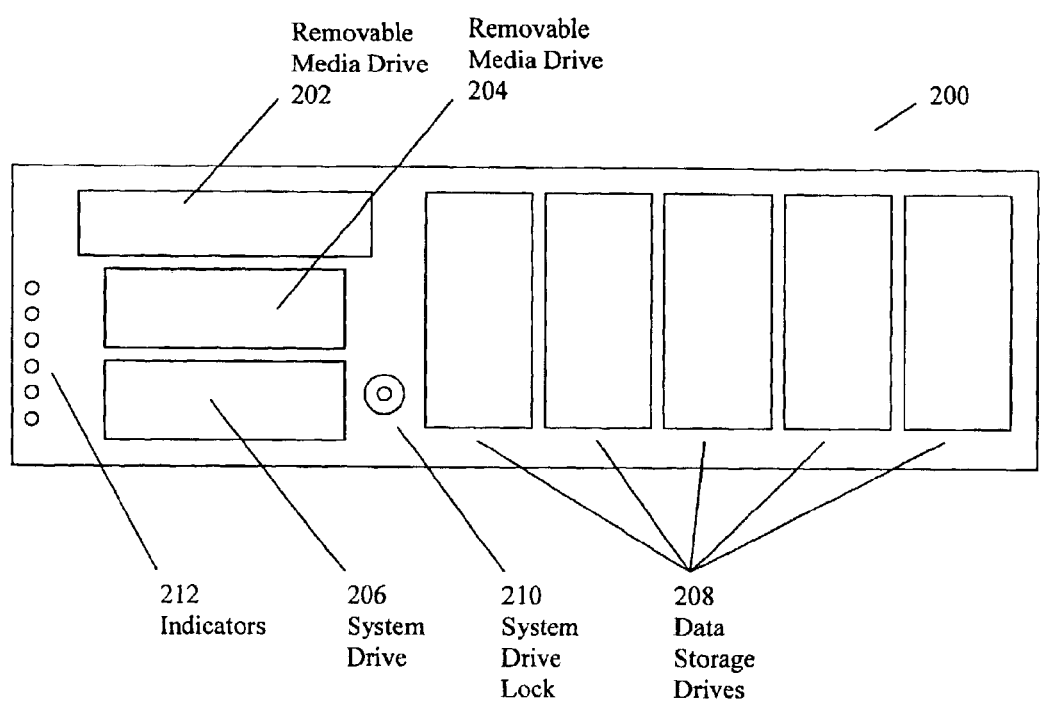
FIG. 2 depicts a front panel layout embodiment of a data processing system.

FIG. 2 depicts a front layout embodiment of a data processing system. The data processing system may be a digital video security system. Front layout 200 may comprise first removable media drive 202, second removable media drive 204, system drive 206, data storage drives 208, system drive lock 210, and indicators 212. First removable media drive 202 and/or second removable media drive 204 may be a read/write unit such as CDs, DVD, ZIP™ or any other removable media unit. In one embodiment of the present invention, data storage drives 208 are disposed in an array like manner wherein each data drive has a common orientation to the cabinet; and system drive 206 is disposed in a dissimilar manner such that the system drive may be easily distinguished from the data storage drives through the position, orientation, color, or other aspect of disposition of the system drive. For example, as shown in FIG. 2, the system drive may be a removable drive installed in a horizontal orientation while data drives are installed in a vertical orientation. In an embodiment of the present invention, different color drives or component trays (later described) are employed for the system drive and data storage drives. The system drive may be further identified by drive lock 210. System drive 206 and data storage drives 208 may be "hot pluggable" such that they may be installed or removed without removing power from the system. Front panel indicators 212 may be configured such that a drive indicator is illuminated or otherwise in an active state when the corresponding drive is operating correctly, including the drive being in a "spun down" condition or quiescent state where the media is not rotating. This is in contrast to typical indicator utilization where the indicator is only illuminated when a drive is being accessed. Alternatively, indicators may flash, change color, or produce other visual changes (such as varying in intensity, for example) to indicate the state of components. The system may also provide a "test indicators" function to provide confirmation of indicator operation.

Figure 3A:
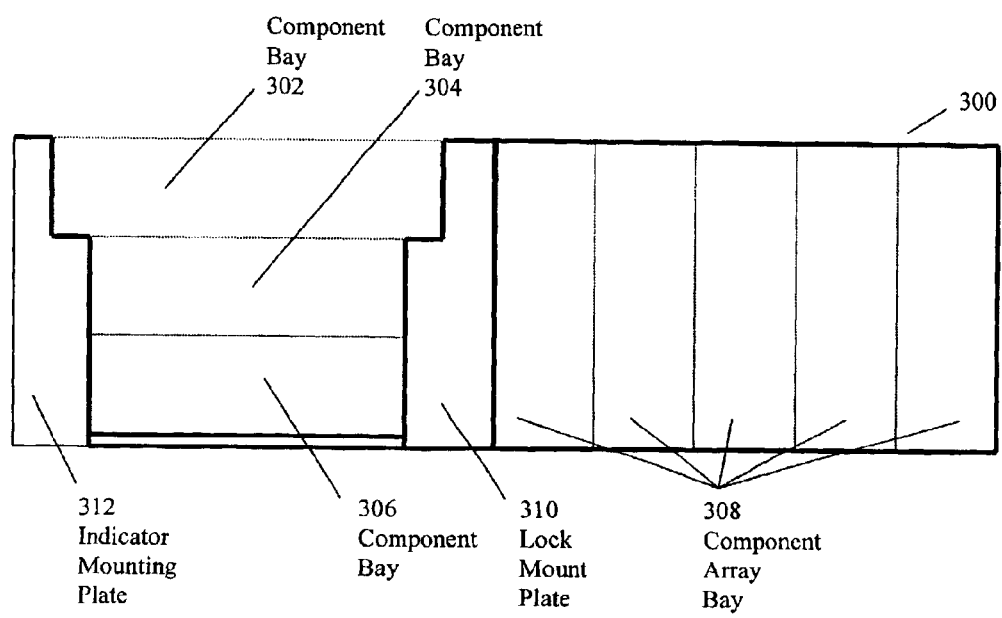
FIG. 3A depicts a component-mounting fixture for a data processing system.
Figure 3B:
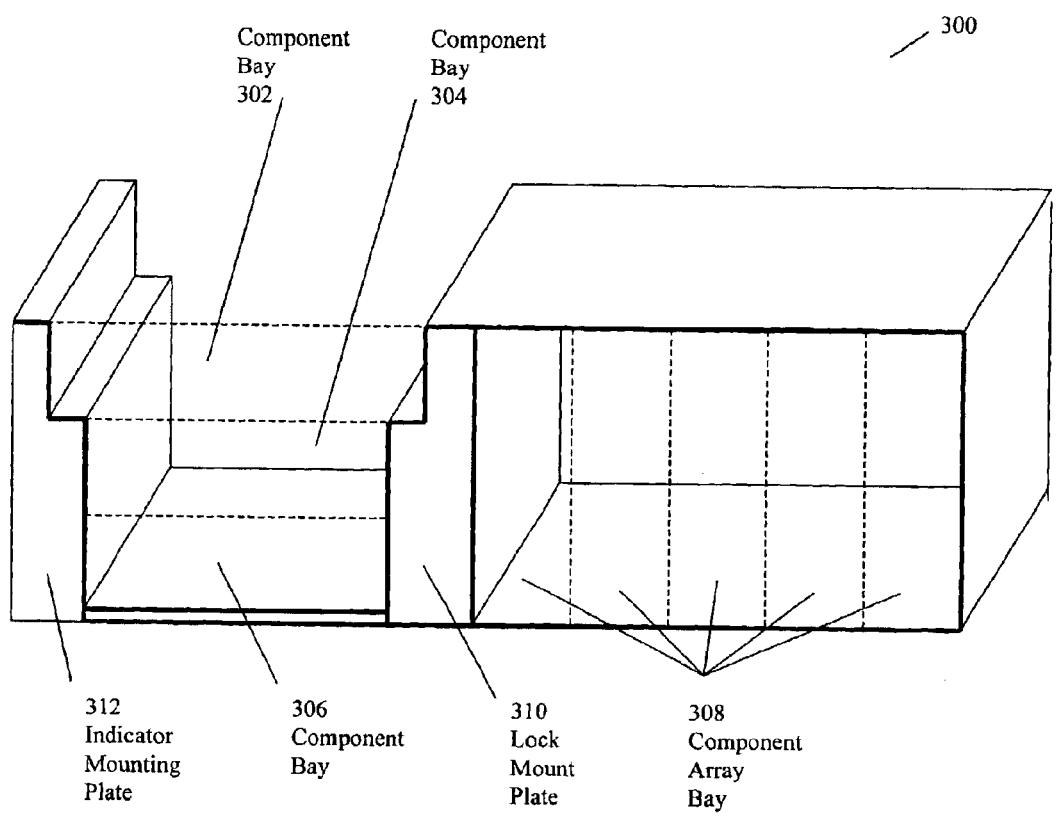
FIG. 3B is a perspective view of the component mounting depicted in FIG. 3A.

FIG. 3A depicts a component-mounting fixture for a data processing system. Fixture 300 comprises first component bay 302, second component bay 304, third component bay 306, component array bay 308 that may contain a plurality of components disposed in a similar orientation, optional lock mount plate 310 for component bay 306, and optional indicator mounting plate 312. First component bay 302 may support standard width peripheral components, such as CD ROM drives, for example. The components may be termed as a standard width or 5.25" components. Second component bay 304 may support reduced width peripherals, such as 3½-inch disk drives or floppy drives for example. Components installed in bay 304 may be termed as reduced width bay or 3.5" components. Advantageously, component-mounting fixture 300 allows a data processing system with replaceable components to be constructed in an industry standard cabinet including 3U height cabinets. The cabinet may comprise a rack mount cabinet or freestanding cabinet or any cabinet of similar dimensions. Component mounting fixture 300 may include component guides and other surface variations to align and position components within the bays. Component mounting fixture 300 may include flanges, tabs, or other surfaces to support connectors, connector assemblies, or circuit cards with connectors or any combination thereof to provide signal and power connections to components. In an embodiment of the present invention, one or more components may be disposed in a component tray that is then inserted into a bay of component mounting fixture 300. One embodiment of a component tray is described in FIG. 5. In an embodiment of the present invention, dimensions of component mounting fixture 300 allow installation in a 3U 19-inch rack. 3U refers to the height of the cabinet where 1U=1 ¾ inches=44.5 mm, such that a 3U cabinet interior height is 5.25 inches. FIG. 3B is a perspective view of the component mounting depicted in FIG. 3A.

FIG. 4 depicts a rack assembly comprising a component-mounting fixture disposed in a rack or freestanding cabinet. Rack assembly 400 comprises rack 402, component mounting fixture 404, front cover 408 and lock 410. Front cover 408 may be attached to rack 402 with one or more hinges, straps, or other hardware that allows the cover to be opened and closed. Lock 410 may be keyed, numerical or other type of lock and may have a key, combination, or other means of operation that matches that of a system drive, or the means of operation may be dissimilar or have a different key or combination from that of the system drive. Component mounting fixture 404 may be disposed in rack 402 such that a gap 406 exists between a surface of component mounting fixture 404 and rack 402. Gap 406 may be employed to receive a retaining or lock tab from a component tray, as described in FIG. 5.

Figures 5A, 5B:
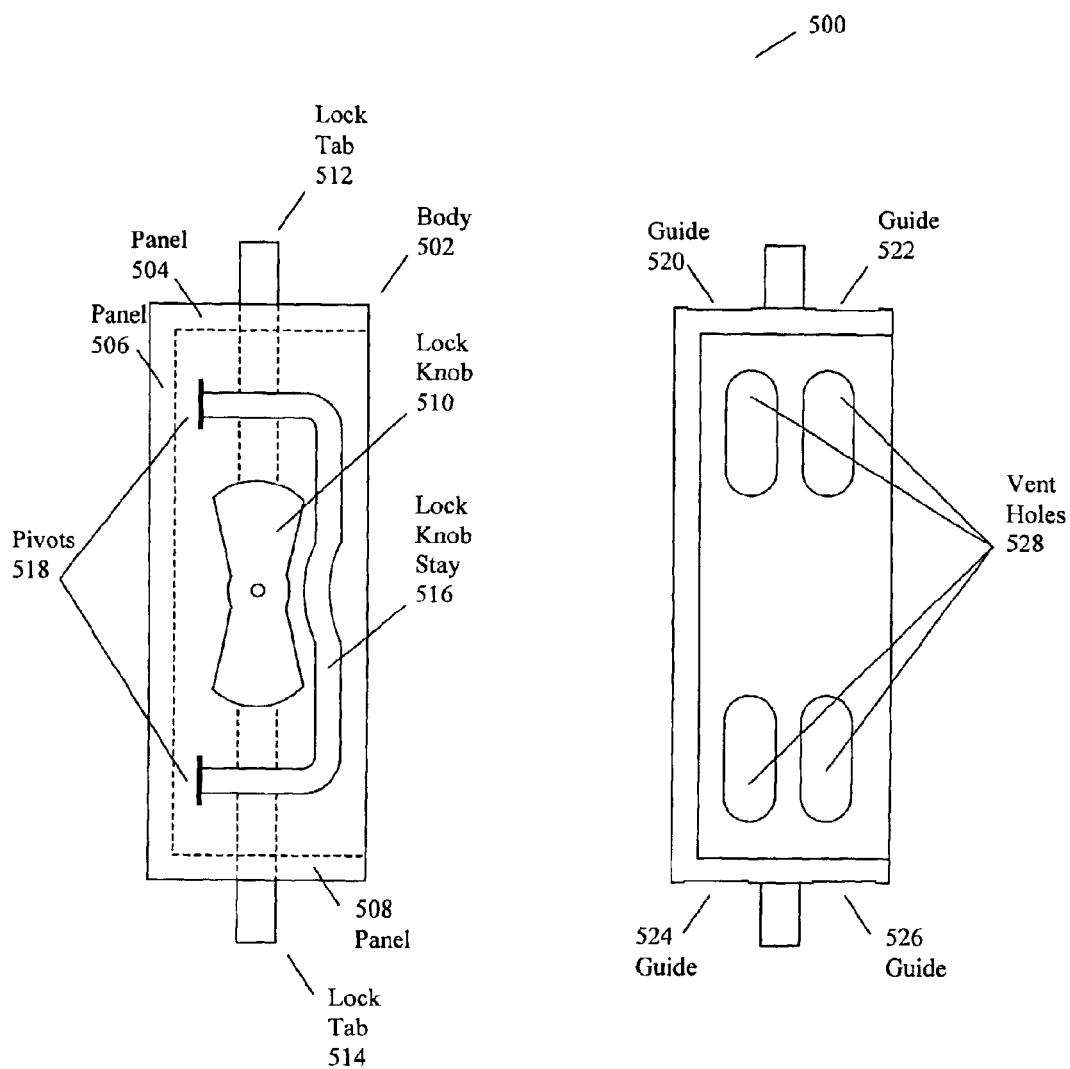
FIG. 5A is a front view depicting a component tray that may be removably installed in a component-mounting fixture.
FIG. 5B is a rear view of component tray 500.

FIG. 5A is a front view depicting a component tray that may be removably installed in a component-mounting fixture. Component tray 500 comprises body 502, first panel 504, second panel 506, third panel 508, lock knob 510, first lock tab 512, second lock tab 514, lock knob stay 516, and lock knob stay pivots 518. Component tray 500 accommodates components such as hard disk drives, but is not restricted to a specific type of component. Component tray 500 allows a disk drive or other component to be removably installed in a mounting fixture and to be held in place when installed by at least one tab and in one embodiment first lock tab 512 and second lock tab 514. First lock tab 512 and second lock tab 514 are extended or retracted by lock knob 510 and are depicted in an extended position. Lock knob stay 516 serves to restrict movement of lock knob 510 when in a first position and may also function as a handle to facilitate removal of component tray 510. Lock knob stay pivots on lock knob stay pivots 518, allowing lock knob stay to be placed in the first position when component tray 500 is installed and to be placed in the second position serving as a handle for easy removal of component tray 500 from a mounting fixture. Component tray 500 may include a surface or panel to which one or more connectors and optionally one or more circuit elements may be affixed to provide connection between the component accommodated in tray 500 and a mounting fixture. Circuit elements may provide signal conditioning, format translation (such as ATA to SCSI translation, for example) or other functions. Also, such elements may provide hot plugging capabilities such that the component tray may be installed or removed without turning off power to the system. Advantageously, lock knob stay 516 restricts movement of lock knob 510 when placed in a position coplanar (flush) with the front surface of component tray 500. This provides additional reliability and reduces the likelihood that component tray may become dislodged or otherwise change position and possibly lose connection with the mounting fixture. The locking mechanism of component tray 500 (comprising first lock tab 512 and/or second lock tab 514, lock knob 510, and lock knob stay 516) serve to insure that component tray is inserted into a bay of the component fixture to a predetermined position. If the component tray is not inserted far enough into a bay of the mounting fixture, a lock tab (or lock tabs) may not align with gap 406 of FIG. 4, restricting movement of lock knob 510 such that lock knob stay cannot be placed in a position flush with the front surface of component tray 500 and such that lock knob stay 516 may inhibit closure of cover 408 of FIG. 4 to a fully closed position, providing an indication that a component tray is not properly installed.

Figure 5C:
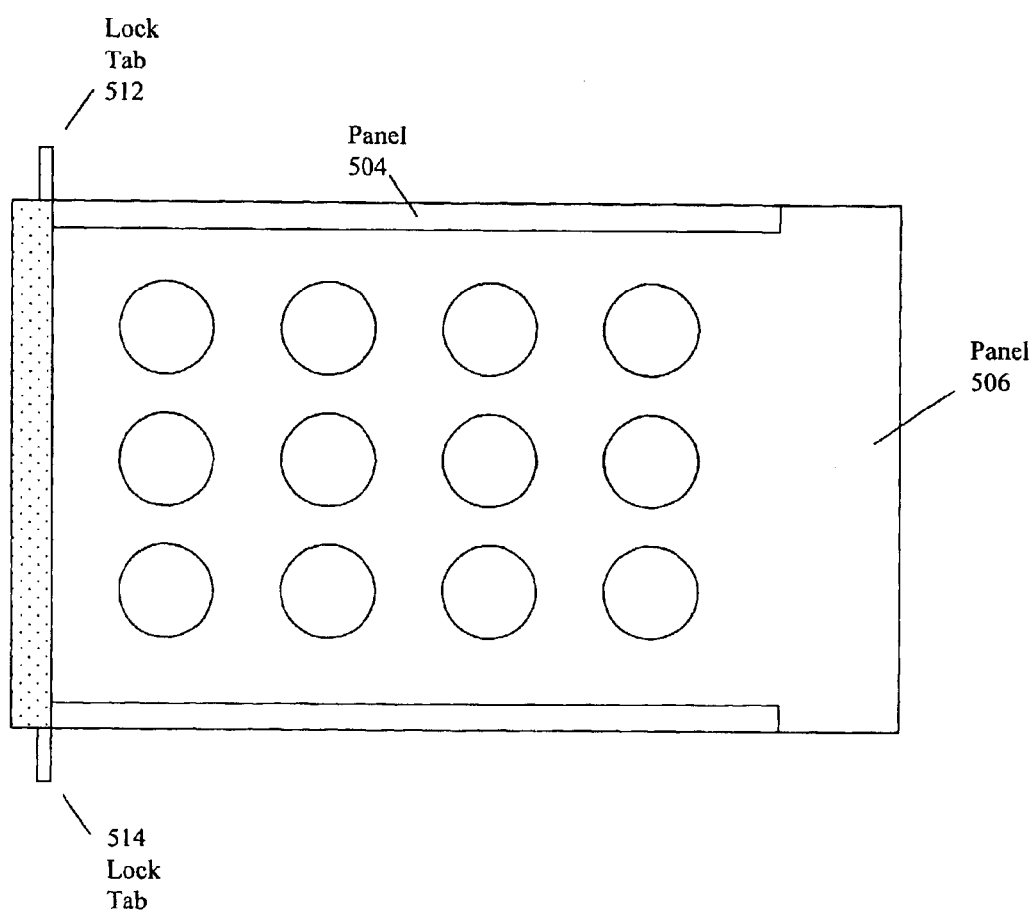
FIG. 5C is a side view of a component tray.

FIG. 5B is a rear view of component tray 500. First panel 504 may contain guides 520, 522 and third panel 508 may contain guides 524, 528. Guides serve to align component tray 500 in a bay of a mounting fixture. Vent holes 528 in the front panel of component tray 500 allow for airflow and cooling of the components. Vent holes may also be implemented in second panel 506 of mounting tray 500, as depicted in FIG. 5C. FIG. 5C is a side view of a component tray. As depicted in FIG. 5C, component tray may include vent holes in second panel 506.

In an embodiment of the present invention, a user may receive a system comprising the components described in FIG. 1. The user may employ a lock to secure the system drive and another lock to secure a front panel or door of a cabinet containing the system. With camera inputs connected and a network interface activated, the user may control operation of the digital video security system from a remote location via the network interface. Digital video data stored on one or more data storage drive(s) may be reviewed, transferred across the network, or may be deleted. As previously noted, the system may operate for weeks, months, or even years without accessing the system cabinet. Different versions of the operating software may be installed across the network. At some point in time, the user may access the system cabinet to replace a component that has failed, or is estimated to fail by system software, or may access the system cabinet to upgrade system software through installation of a system hard drive, or to upgrade components, such as installing larger capacity data drives, for example. Since the user may not have accessed the system cabinet in some time, the present invention advantageously provides a configuration where components may be easily identified. The present invention furnishes a user-friendly that provides easy identification of removable system components through position, orientation, or color of the components or a combination thereof. Operating condition of components may be conveyed through indicators such that a component that is not operating correctly, or that may be predicted to fail, may be easy identified. The component tray embodiments of the present invention allow simple installation and removal of components without removing or installing screws, nuts, bolts, or other fasteners. Component trays may be hot pluggable and may be removed or installed without removing power to the system.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A data processing system having replaceable components comprising:
   a cabinet having a user accessible front portion;
   a processor and memory disposed in said cabinet;
   a plurality of data storage devices disposed in a first orientation in said cabinet and removably accessible from the front portion of said cabinet;
   a system data storage device disposed in said cabinet in a second orientation dissimilar from the first orientation for distinguishing said system data storage device from said plurality data storage devices, said system data storage device being removably accessible from the front portion of said cabinet; and
   a removable media drive disposed in said cabinet such that the media is removably accessible from the front portion of said cabinet; said processor, said memory, said plurality of data storage devices, said system data storage device and said removable media drive cooperating to form said data processing system, such that said dissimilar orientation of said plurality of data storage devices and said system data storage device readily distinguishes said plurality of data storage devices and said system data storage device.

2. The system of claim 1 wherein said system data storage device is of a color different than that of said data storage devices.

3. The system of claim 1 wherein said system data storage device includes a keyed locking mechanism that inhibits removal of said system data storage device when said locking mechanism is engaged.

4. The system of claim 1 wherein said system data storage device and said data storage devices are hot pluggable.

5. The system of claim 1 further comprising:
   a plurality of indicators, one indicator corresponding to each component of a plurality of components, that show the operating condition of the component.

6. The system of claim 5 wherein said one indicator is in an active state when the corresponding component is in a correct operating condition including when said component is in a quiescent state.

7. The system of claim 1 wherein said cabinet is a 3U height cabinet.

8. The system of claim 1 further comprising:
   a video capture unit disposed in said cabinet receiving a video input wherein said processor, said memory, said plurality of data storage devices, said system data storage device, said removable media drive, and said video capture unit cooperating to form a digital video security system.

9. A data processing system having replaceable components comprising:
   a cabinet having a user accessible front portion;
   a processor and memory disposed in said cabinet;
   a component mounting fixture disposed in said cabinet having a first bay having a first orientation and plurality of second bays having an orientation dissimilar from than said first orientation such that said dissimilarity in orientation is readily distinguishable;
   a system data storage device disposed in said first bay of said component mounting fixture wherein said system data storage device is removably accessible from the front portion of said cabinet;
   at least one data storage device disposed in one of said plurality of second bays of said component mounting fixture wherein said at least one data storage device is removably accessible from the front portion of said cabinet;
   a removable media drive disposed in another bay of said component mounting fixture such that the media of said removable media device is accessible from the front portion of said cabinet, said processor, said memory, said at least one data storage device, said system data storage device and said removable media drive cooperating to form said data processing system, such that said dissimilar orientation of said plurality of second bays and said first bay readily distinguishes said at least one data storage device and said system data storage device.

10. The system of claim 9 wherein said system data storage device is of a color different than that of said data storage devices.

11. The system of claim 9 wherein said component mounting fixture further comprises a lock mounting plate operable to receive a keyed lock that inhibits removal of said system data storage device when said lock is engaged.

12. The system of claim 9 wherein said system data storage device and said data storage devices are hot pluggable.

13. The system of claim 9 wherein said component mounting fixture further comprises:
   an indicator mounting plate to which a plurality of indicators are affixed, one indicator corresponding to each component of a plurality of components, that show the operating condition of the component.

14. The system of claim 13 wherein said one indicator is in an active state when the corresponding component is in a correct operating condition including when said component is in a quiescent state.

15. The system of claim 9 wherein said cabinet is a 3U height cabinet.

16. The system of claim 15 wherein said component mounting fixture further comprises:
   a third bay that accommodates a standard width personal computer peripheral component; and
   a fourth bay that accommodates a reduced width personal computer peripheral component and wherein said plurality of second bays comprises at least five bays.

17. The system of claim 9 further comprising:
   a video capture unit disposed in said cabinet receiving a video input wherein said processor, said memory, said plurality of data storage devices, said system data storage device, said removable media drive, and said video capture unit cooperate to form a digital video security system.

18. A data processing system having replaceable components comprising:
   a cabinet having a user accessible front portion;
   a processor and memory disposed in said cabinet;
   a component mounting fixture disposed in said cabinet having a first bay having a first orientation and plurality of second bays having an orientation dissimilar from said first orientation such that said dissimilarity in orientation is readily distinguishable;
   a system data storage device disposed in a first component tray installed in said first bay of said component mounting fixture wherein said system data storage device is removably accessible from the front portion of said cabinet;
   at least one data storage device disposed in a second component tray installed one of said plurality of second bays of said component mounting fixture wherein said at least one data storage device is removably accessible from the front portion of said cabinet;
   a removable media drive disposed in another bay of said component mounting fixture such that the media of said removable media device is accessible from the front portion of said cabinet, said processor, said memory, said at least one data storage device, said system data storage device and said removable media drive cooperating to form said data processing system, such that said dissimilar orientation of said plurality second bays and said first bay readily distinguishes said at least one data storage device and said system data storage device.

19. The system of claim 18 wherein said first component tray and said second component tray further each comprise:
   a retention mechanism that retains said tray in said bay when a lock knob of said retention mechanism is in a first position and that permits removal of said tray when said lock knob is in a second position.

20. The system of claim 19 wherein said component trays further comprise:
   a lock knob stay that restricts movement of said lock knob when said lock knob stay is in a first position.

21. The system of claim 20 wherein said lock knob stay serves as a handle when in a second position.

22. The system of claim 19 further comprising:
   a gap formed between said component mounting fixture and said cabinet that receives a retention tab of said retention mechanism.

23. The system of claim 19 further comprising:
   a connector disposed on said component tray that provides signal communication for the device disposed in said tray.

24. The system of claim 23 further comprising:
   a circuit affixed to said second component tray that provides format conversion for signals communicating with said at least one data storage device.

25. The system of claim 18 wherein said system data storage device is of a color different than that of said data storage devices.

26. The system of claim 18 wherein said component mounting fixture further comprises a lock mounting plate operable to receive a keyed lock that secures said first component tray.

27. The system of claim 18 wherein said system data storage device and said data storage devices are hot pluggable.

28. The system of claim 18 wherein said component mounting fixture further comprises:
   an indicator plate providing a mounting surface for a plurality of indicators component.

29. The system of claim 18 further comprising:
   a video capture unit disposed in said cabinet receiving a video input wherein said processor, said memory, said plurality of data storage devices, said system data storage device, said removable media drive, and said video capture unit cooperate to form a digital video security system.

30. The system of claim 18 wherein said cabinet is a 3U cabinet.

31. The system of claim 30 wherein said component mounting fixture further comprises:
   a third bay that accommodates a standard width personal computer peripheral component; and
   a fourth bay that accommodates a reduced width personal computer peripheral component and wherein said plurality of second bays comprises at least five bays.

* * * * *